Nov. 27, 1962    M. A. SUMMEROUR    3,065,589
LAWN MOWER WITH SHAFT PROTECTING DEVICE
Filed Oct. 13, 1960

INVENTOR.
Marion A. Summerour
BY
John A. Hamilton
Attorney.

United States Patent Office 3,065,589
Patented Nov. 27, 1962

3,065,589
LAWN MOWER WITH SHAFT
PROTECTING DEVICE
Marion A. Summerour, 6125 Reinhardt Drive,
Mission, Kans.
Filed Oct. 13, 1960, Ser. No. 62,351
4 Claims. (Cl. 56—25.4)

This invention relates to new and useful improvements in lawn mowers, and has particular reference to lawn mowers of the "rotary" type in which the blades are carried at the lower end of a vertical drive shaft extending downwardly from a power unit mounted on a wheeled base.

Lawn mowers of this type have heretofore been subject to common and recurrent damage to the drive shaft due to the fact that the drive shaft inherently must extend downwardly from the base to a considerable extent, and this extended portion of the shaft is normally without lateral support. Thus when the blade or blades carried by the shaft strike a heavy obstruction such as a rock, tree, sidewalk or the like, the shock is transmitted to the shaft and causes bending thereof. This necessitates expensive repair. Previous attempts to solve this problem have not, to my knowledge, been wholly successful. For example, the use of an extremely heavy drive shaft is reasonably effective, but prohibitively expensive. "Clutch" mountings of the blades to the shaft, so that the shaft in theory turns even if the blade is stopped by an obstruction, are ineffective since the shock is so sudden, and the inertia of the parts and release pressure of the clutch so great, that shaft damage often occurs before the clutch can release. Rigidly mounted auxiliary shaft bearings adjacent the lower end of the shaft have also been tried, but are ineffective for at least two reasons. First, such auxiliary bearings are difficulty to install and maintain in accurate alignment with the shaft, and second the shocks normally delivered to the shaft are simply transferred to the bearing, with the result that the bearing itself may soon fail and require replacement.

The principal object of the present invention is, therefore, the provision of a lawn mower having a shaft protecting device having none of the above objectionable features. My device includes an auxiliary bearing member adjacent the extended end of the drive shaft, supported by a bearing holder fixed to the mower base. The holder maintains the bearing axis against tilting relative to the normal position of the shaft axis, but permits the bearing to move freely transversely to said shaft, and the bearing supports the portion of the shaft engaged thereby from tilting when the shaft is deflected. Thus while the shaft may still be deflected when the blade is obstructed, the restraint offered by the auxiliary bearing, in that the portion of said shaft in said bearing is forced to remain parallel to its original position even during deflection, forces the portion of the shaft between the bearing and the base to flex in an S-curve or compound curve, first in one direction and then in the opposite direction. The radius of each portion of the curve is much smaller than if the shaft were allowed to deflect in a simple curve from the base, and the resistance of the shaft to deflection is therefore much greater. The stiffening of the shaft produced by the bearing is much the same as if the unsupported length of the shaft were much shorter than it actually is. At the same time, the auxiliary bearing is yieldable so that in normal operation it is never required to absorb the severe shocks that it would if it were rigidly mounted. Also, the auxiliary bearing automatically aligns itself with the shaft, so that the bearing holder need not be installed with extreme accuracy.

Another object is the provision of a shaft protecting device as described above wherein the bearing holder provides a stop limiting the maximum movement of the bearing laterally of the shaft, so that the flexure of the shaft will at all times be maintained within the elastic limit thereof. This of course involves a positive stoppage of motion and hence entails shock loading of the bearing and stop, but said shock loading will be greatly reduced since the shock will already have been largely or partially absorbed in resilient flexure of the shaft.

Other objects are simplicity and economy of construction, efficiency and dependability of operation, and adaptability for application to many pre-existing types of lawn mowers.

With these objects in view, as well as other objects which will appear in the course of the specification, reference will be had to the drawing, wherein.

Figure 1:
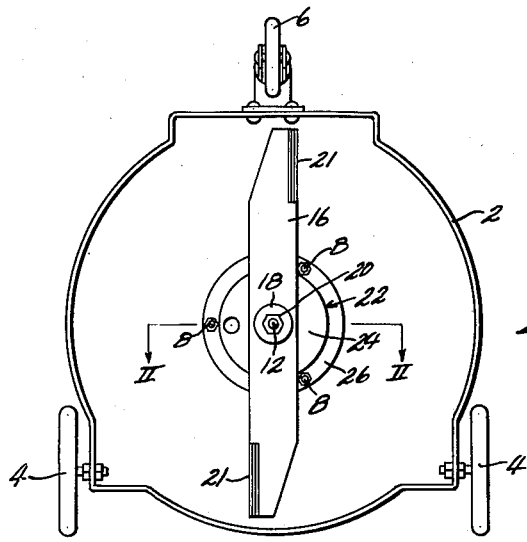
FIG. 1 is an inverted plan view of the base portion and related parts of a rotary lawn mower including a shaft protecting device embodying the present invention.
Figure 2:
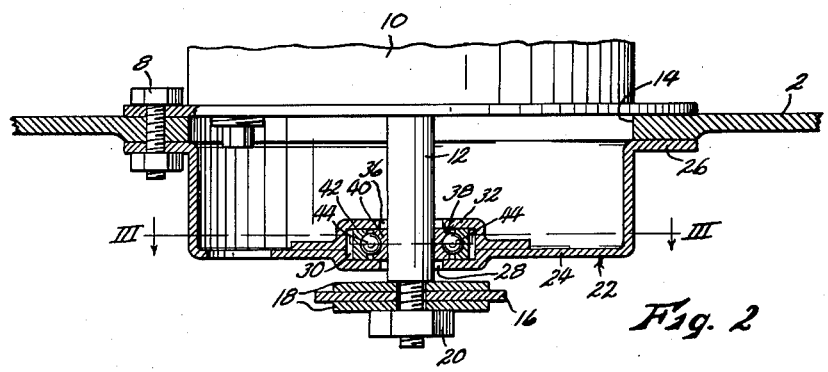
FIG. 2 is an enlarged, fragmentary sectional view taken on line II—II of FIG. 1.
Figure 3:
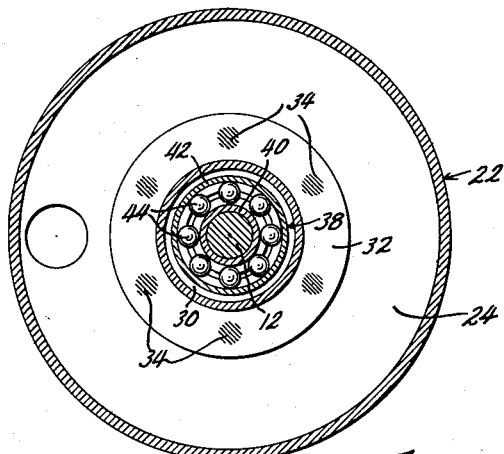
FIG. 3 is a sectional view taken on line III—III of FIG. 2.

Like reference numerals apply to similar parts throughout the several views, and the numeral 2 applies to the base or platform member of a rotary lawn mower, usually formed of cast or sheet metal and having the form of an inverted dish, being supported by a pair of front ground-engaging wheels 4 mounted thereon, and a castered rear wheel 6. Mounted on the upper surface of said base by bolts 8 is a gasoline engine 10. The drive shaft 12 of said engine extends downwardly through a central aperture 14 of the base, to a point substantially beneath said base. It will be understood that said shaft is provided with the usual bearings, not shown, within the engine. A horizontal blade bar 16 is affixed at its midpoint to the lower end of shaft 12, by means of washers 18 and nut 20. The blade bar has radial cutting edges 21 at its outer ends. The structure thus far described is common to mowers of this type, and is shown by way of example only.

The shaft protecting device includes a bearing holder 22 formed of steel and comprising a cylindrical cup having a flat bottom wall 24 and a peripheral flange 26 surrounding its open upper end, said flange being secured to the lower surface of base 2 by any suitable means such as bolts 8. Bottom wall 24 of the holder is perforated at 28 to receive shaft 12. A circular plate 32 is affixed to the upper surface of wall 24 concentrically with the shaft, as by spot welding indicated at 34. Said plate has a hole 36 formed centrally therein for receiving the shaft. A flat circular recess 30 is formed between wall 24 and plate 32, concentrically with the shaft, by offsetting a portion of wall 24 downwardly and offsetting a portion of plate 32 upwardly. Carried in said recess is a flat, circular ball bearing 38 comprising an inner race 40, outer race 42, and a series of bearing balls 44 between said races. Inner race 40 is fitted snugly on shaft 12, to prevent relative tilting between the axis of the bearing and the axis of the shaft. The outer race 42 is of smaller diameter than recess 30, so that the bearing can shift in said recess transversely to the shaft. Both of the races are engaged snugly but slidably between the plates 24 and 32. That is, they may slide between said plates in any direction radial to the axis of the bearing, but said plates prevent the bearing from tilting, whereby although the bearing may slide radially, its axis always remains parallel to its original position.

It will be seen that when blade bar 16 strikes an obstruction, the reactive shock of the impact will be transmitted to shaft 12, tending to deflect it laterally to its axis, and experience has shown that bending of the shaft will often result if the shaft is not protected. In the present structure the shaft may still be deflected, since bearing 38 is free to shift radially in recess 30. However, said bearing nevertheless still stiffens the shaft because the portion of the shaft in the bearing is prevented from tilting, due to the fact that the bearing itself cannot tilt for the reasons discussed above, and therefore even when deflected must remain parallel to its original position. This forces the portion of the shaft between engine 10 and bearing 38 to be flexed in a double or S-curve as previously discussed, so that the shaft, in each portion of the curve, must be flexed about a short radius, to which it has a much greater resistance than if it were flexed in a simple curve extending all the way from the engine to the bearing. In other words, bearing 38 may be said to shorten the effective length of the extended portion of the shaft, and thereby to increase its resistance to deflection. At the same time, deflection is still permitted, though to a reduced degree, so that the shock load on the bearing is greatly reduced, whereby to reduce the damage to the bearing itself which would otherwise occur as a result of the hammering action thereon.

If the shock delivered to the shaft is severe, it may force bearing 38 against the peripheral wall of recess 30, thereby providing a positive stop against further deflection of the shaft. For obvious reasons, the clearance between bearing and recess wall should be less than the clearance between the shaft and holes 28 and 36 of walls 24 and 32. The shock of this positive stoppage is greatly reduced from what it would be if bearing 38 were rigidly mounted, by the fact that the force of the shock has already been partially absorbed in resilient flexure of the shaft. This stop action should occur before the shaft has been flexed beyond its elastic limit, to avoid permanent deformation of the shaft, and the clearance between the bearing and the peripheral wall of recess 30 is proportioned accordingly. The clearance will be determined by several factors such as the diameter and unsupported length of the shaft and the properties of the steel or other material from which it is formed.

The tendency of shaft 12 to tilt as it is deflected will of course impose a twisting load on bearing 38, tending to force inner race 40 out of the plane of outer race 42. This tendency is resisted in the present structure by the fact that both of said races are retained snugly between wall 24 and plate 32.

While I have shown and described a specific embodiment of my invention, it will be readily apparent that many minor changes of structure and operation could be made without departing from the spirit of the invention as defined by the scope of the appended claims.

What I claim as new and desire to protect by Letters Patent is:

1. In a lawn mower having a base, a power unit mounted on said base, a drive shaft driven by said power unit and extending downwardly from said base, and a blade mounted at the extended end of said shaft, a shaft protecting device comprising a bearing member engaging said shaft adjacent said blade and having the form of a flat circular disc secured coaxially on said shaft and secured against tilting relative to said shaft, and a bearing holder rigidly secured to said base and including members forming a flat circular recess concentric with said shaft and containing said bearing disc, the axial thickness of said recess corresponding closely to the axial thickness of said bearing disc and the diameter of said recess being greater than the diameter of said bearing disc, whereby said bearing disc is prevented from tilting out of the plane of said recess but is permitted to slide freely in said recess transversely to its axis.

2. The structure as defined in claim 1 wherein the amount by which said recess diameter exceeds said bearing diameter is such that the maximum lateral deflection of said shaft permitted by movement of the bearing in the recess is maintained within the elastic limit of said shaft.

3. The structure as defined in claim 1 wherein said bearing member constitutes inner and outer annular races with anti-friction rollers disposed in the annular space between said races, said inner race being fitted snugly on said shaft and said outer race being fitted snugly but slidably between the end walls of said recess.

4. The structure as defined in claim 1 wherein said bearing member constitutes inner and outer annular races with anti-friction rollers disposed in the annular space between said races, said inner race being fitted snugly on said shaft and both of said races being fitted snugly but slidably between the end walls of said recess.

References Cited in the file of this patent

UNITED STATES PATENTS

| | | |
|---|---|---|
| 1,622,611 | Sera | Mar. 29, 1927 |
| 2,815,634 | Bush | Dec. 10, 1957 |
| 2,896,603 | Buske et al. | July 28, 1959 |
| 2,940,241 | Stahl | June 14, 1960 |